United States Patent [19]
Gordon et al.

[11] Patent Number: 5,934,205
[45] Date of Patent: Aug. 10, 1999

[54] Y-SHAPED DISTRIBUTOR WITH LINER ASSEMBLY FOR DISTRIBUTION OF PULVERIZED COAL AND AIR MIXTURE

[75] Inventors: Everton S. Gordon, Bloomfield; Janusz Pietkevich, South Windsor; Ronald H. Nowak, East Longmeadow; Gerald N. Bittner, South Windsor, all of Conn.

[73] Assignee: Combustion Engineering, Inc., Windsor, Conn.

[21] Appl. No.: 08/773,464

[22] Filed: Dec. 23, 1996

[51] Int. Cl.$^6$ .............................. F23K 3/00; F23D 1/00; B65G 51/18

[52] U.S. Cl. .................. 110/101 R; 110/263; 110/267; 406/193

[58] Field of Search ..................... 110/101 R, 104 R, 110/105, 106, 110, 111, 263, 267, 297, 349; 138/147, 153, 172, 174, DIG. 4; 406/181, 191, 193; 285/16; 55/435

[56] References Cited

U.S. PATENT DOCUMENTS

| | | | |
|---|---|---|---|
| 879,688 | 2/1908 | Snoddy | 138/147 |
| 1,626,490 | 4/1927 | Wotruba | 406/193 |
| 1,710,577 | 4/1929 | Hahn | 138/147 |
| 3,376,897 | 4/1968 | Dolder et al. | 138/39 |
| 3,567,288 | 3/1971 | Wood | 406/156 |
| 4,284,106 | 8/1981 | Haas et al. | 138/147 |
| 4,479,743 | 10/1984 | Stahl | 406/193 |
| 4,570,549 | 2/1986 | Trozzi | 110/106 |

FOREIGN PATENT DOCUMENTS

| | | | |
|---|---|---|---|
| 411179 | 4/1910 | France | 138/147 |
| 3505461 A1 | 10/1985 | Germany | 406/193 |
| 7505 | of 1916 | United Kingdom | 285/16 |
| 885543 | 12/1961 | United Kingdom | 285/16 |

*Primary Examiner*—Ira S. Lazarus
*Assistant Examiner*—Ljiljana V. Ciric
*Attorney, Agent, or Firm*—Robert S. Smith

[57] ABSTRACT

Apparatus for cooperation with an associated coal burning furnace which includes a Y-shaped distributor body having one inlet and first and second outlets and a splitter disposed in the body for dividing flow between the first and second outlets. The splitter has a generally V-shaped contour and the splitter comprises a base on the housing and a liner assembly mounted on the base. In some forms of the invention the liner assembly has a surface that is harder than the surface of the housing and the housing includes a removable access panel. The access panel may be dimensioned and configured to allow passage of the liner assembly into and out of the housing. The liner assembly may comprise an outer shell having at least some foamed material disposed therein and may include anchoring means disposed in the foamed material. In other forms of the invention the anchoring means may be dimensioned and configured for engagement with the housing to anchor the liner assembly against the foamed material and the base may include a mounting surface that is generally planar and disposed in generally normal relationship to the direction of flow into the inlet. The base may have diverging sides dimensioned and configured for engaging the liner assembly and the anchoring means may include a plurality of eyebolts.

20 Claims, 4 Drawing Sheets

Y-SHAPED DISTRIBUTOR WITH LINER ASSEMBLY FOR DISTRIBUTION OF PULVERIZED COAL AND AIR MIXTURE

TECHNICAL FIELD

The present invention relates to the coal delivery systems including the coal piping for delivering pulverized coal to coal fired steam generators. Coal fired furnaces are typically provided with a plurality of ducts or pipes through which pulverized coal and air is directed to a plurality of fuel-air admission assemblies arrayed in respective vertically extending windboxes. The windboxes are disposed in one or more walls of the furnace and each introduces coal and air into the furnace.

Pulverized coal firing is favored over other methods of burning coal because pulverized coal burns like gas and, therefore, fires are easily lighted and controlled. The present invention has particular application to all such pulverized coal delivery systems. Typically, such systems will include one or more pulverizers, also referred to as mills, that are used to grind or comminute the fuel. The invention also has application to other systems that do not include any pulverizer because a supply of pulverized coal available.

The pipes directing the coal to the respective windboxes are large and cumbersome. Typically the pipes are provided with large couplings or bolted flanges to couple the end abutting axially adjacent portions together. The normal nozzle assembly requires regular maintenance because the pulverized coal has a severe erosive effect. A typical pulverizer will move between 7 and 50 tons of coal every hour. The coal typically moves at a velocity of 75–90 feet per second within the fuel transport pipe.

A typical coal distribution system includes a number of distributors intended to split the flow of air and pulverized coal into two discrete pipes. It is desired that the distributors take the homogeneous mixture and deliver identical quantities of that homogeneous flow to each of the two discrete pipes. Each of these distributors is a Y-shaped duct. Each of these Y-shaped ducts has an inlet and two outlets. It will be readily visualized that the surface intermediate the two outlets and opposite the inlet is particularly vulnerable to erosion. The installation or inspection of a specific Y-shaped often involves a substantial amount of time to remove the various bolts or couplings while simultaneously supporting the respective sections of pipe. More specifically, the process involves supporting the adjacent sections of pipe, removing three couplings, and removing the distributor. After that inspection or replacement, the system must be put back together. This process includes installing the couplings or bolts in the respective flanges and removing the supports for the respective pipes.

Conventional distributors require relatively frequent replacement because of the erosion by the coal and air mixture.

OBJECTS AND SUMMARY OF THE INVENTION

It is an object of the present invention to provide a distributor apparatus which will be more durable.

Another object of the invention is to provide apparatus that will enable replacement of a relatively small part of the distributor rather than the entire distributor.

It is an object of the invention to construct a relatively small part that is relatively inexpensive to manufacture and to install.

Yet another object of the present invention is to provide access to the interior of the distributor to facilitate replacement of an interior part without the necessity for removing the entire distributor.

Still another object of the invention is to provide materials within the distributor that will be much more resistant to erosion than the materials currently used.

It has now been found that these and other objects of the invention may be attained in apparatus for cooperation with an associated furnace is part of a furnace having the capability of burning coal which includes a Y-shaped distributor body or housing having one inlet and first and second outlets and a liner assembly disposed in the housing for dividing flow between the first and second outlets. The liner assembly has a generally V-shape contour. The liner assembly is mounted on the base.

In some forms of the invention the liner assembly has a surface that is harder than the surface of the housing and the housing includes a removable access panel. The access panel may be dimensioned and configured to allow passage of the liner assembly into and out of the housing. The liner assembly may comprise an outer shell having at least some foamed material disposed therein and may include anchoring means disposed in the foamed material.

In other forms of the invention the anchoring means may be dimensioned and configured for engagement with the housing to anchor the liner assembly. The base may include a mounting surface that is generally planar and disposed in generally normal relationship to the direction of flow into the inlet. The base may have diverging sides dimensioned and configured for engaging the liner assembly and the anchoring means may include a plurality of eyebolts.

BRIEF DESCRIPTION OF THE DRAWING

The invention will be better understood by reference to the accompanying drawing in which.

DESCRIPTION OF THE PREFERRED EMBODIMENT

Figure 1:
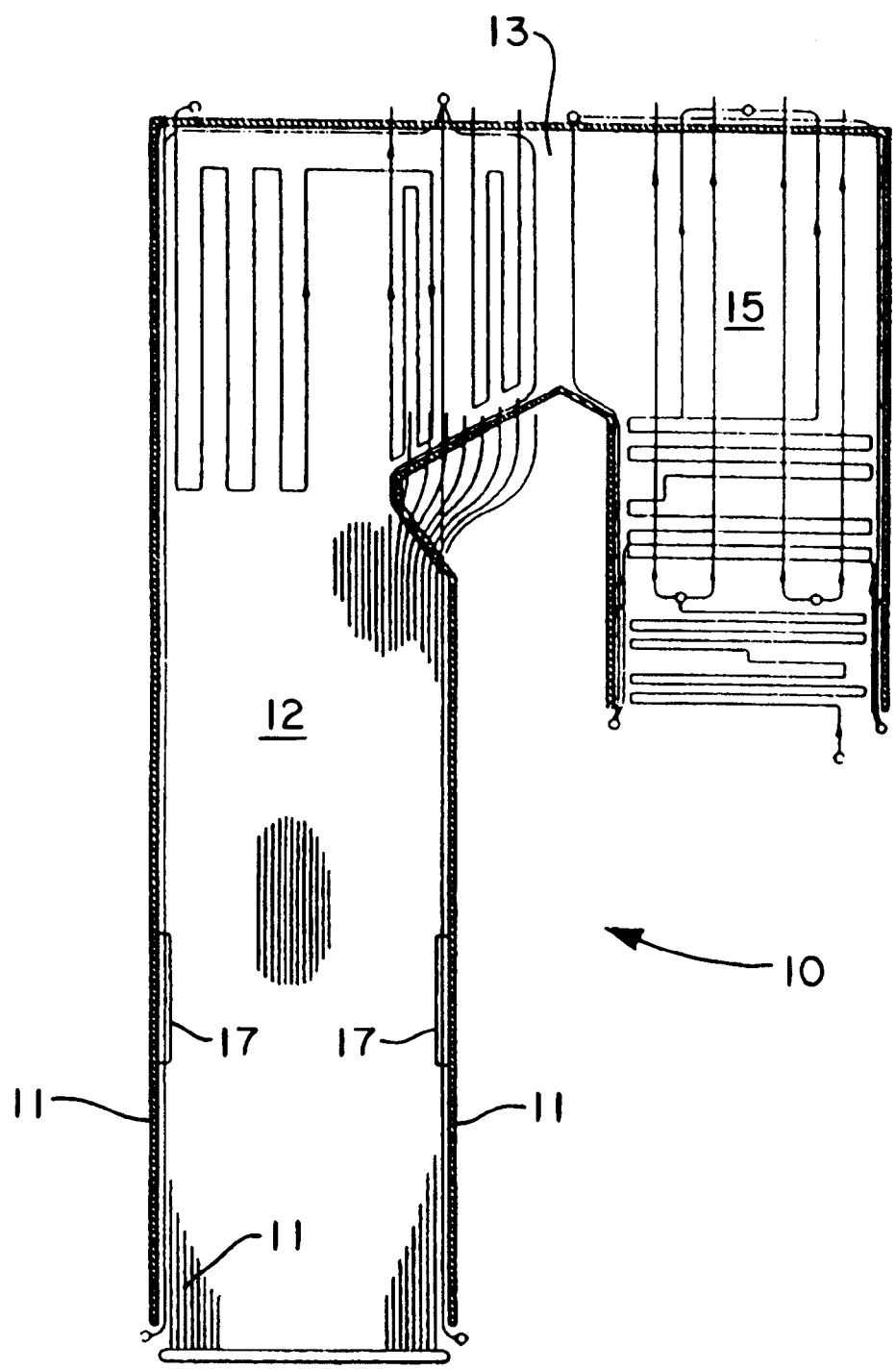
FIG. 1 is a side elevational view of a furnace to which ducts supplying air and coal incorporating the present invention may be attached.

Referring now to FIG. 1 there is shown a conventional furnace 10, having a central cavity 12 surrounded by a front wall, a rear wall and two opposed side walls. The side walls (not shown) are disposed in spaced relationship and join the front wall and the rear wall. Each of these walls is a waterwall 11 comprising a plurality of substantially parallel, substantially coplanar tubular members.

The furnace 10 is vertically disposed and has an outlet for combustion gases at its upper end extending from the rear wall thereof. Extending from this outlet is a lateral gas pass 13 which connects with the upper end of a vertically extending gas pass 15 that extends downwardly in parallel relation with the cavity 12. Combustion gases sequentially pass through the cavity 12, the lateral gas pass 13, the vertically extending gas pass 15 and a stack (not shown). The illustrated furnace 10 includes burners 17. It will be understood the present invention may be incorporated in a wide variety of furnace structures and that the illustrated furnace 10 is only one such furnace.

Pulverized coal firing is favored over other methods of burning coal because pulverized coal burns like gas and, therefore, fires are easily lighted and controlled. Pulverizers, also referred to as mills, are used to grind or comminute the fuel. Pulverized coal fired furnaces are typically provided with a plurality of ducts or pipes to direct the pulverized coal that is burned in the furnace. The pulverized coal and primary air is typically directed to a plurality of fuel-air admission assemblies arrayed in respective vertically extending windboxes. The windboxes are disposed in one or more walls of the furnace.

Figure 2:
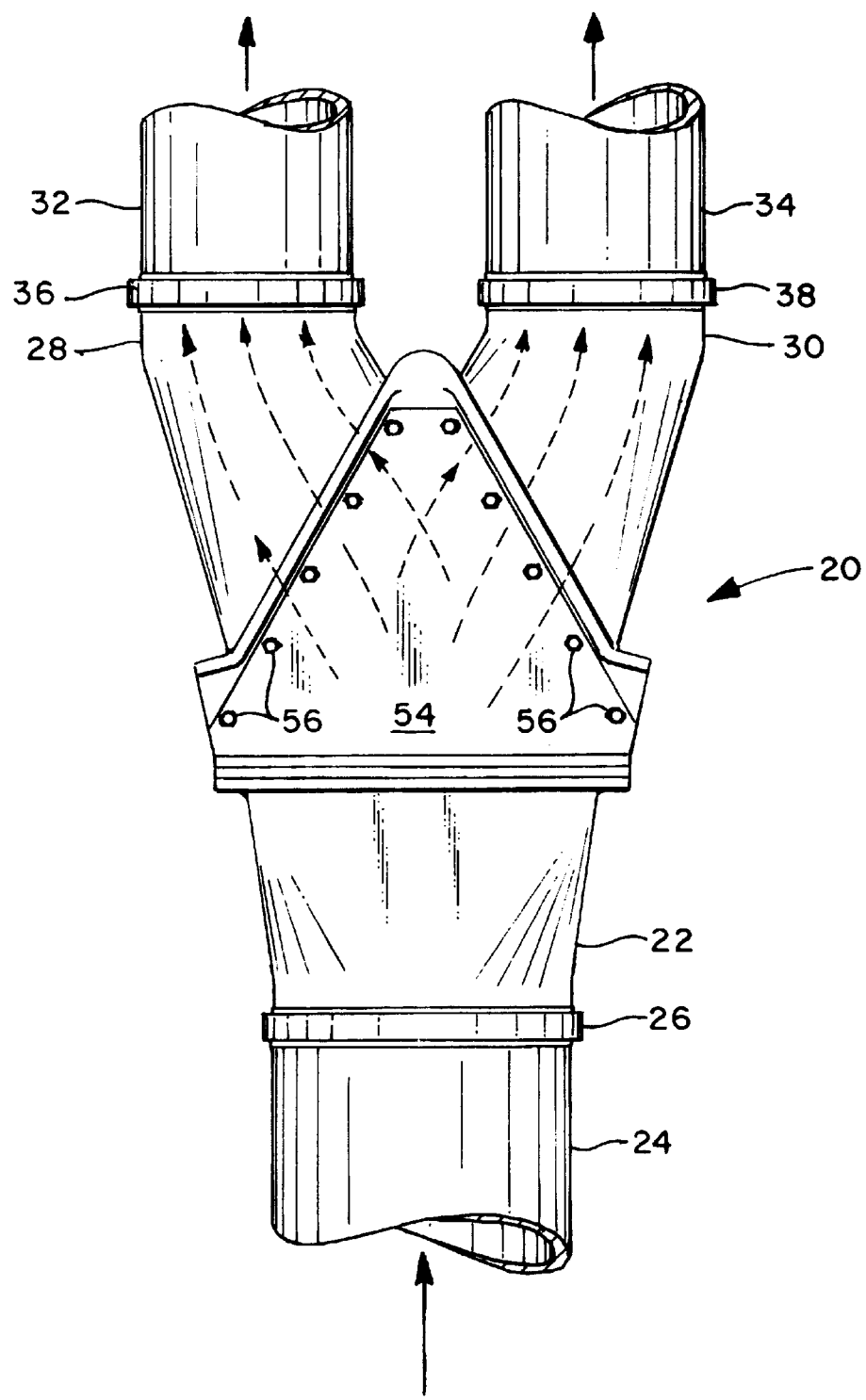
FIG. 2 is an fragmentary plan view of part of the coal distribution system for the furnace shown in in FIG. 1 which illustrates the distributor in accordance with the present invention.
Figure 4:
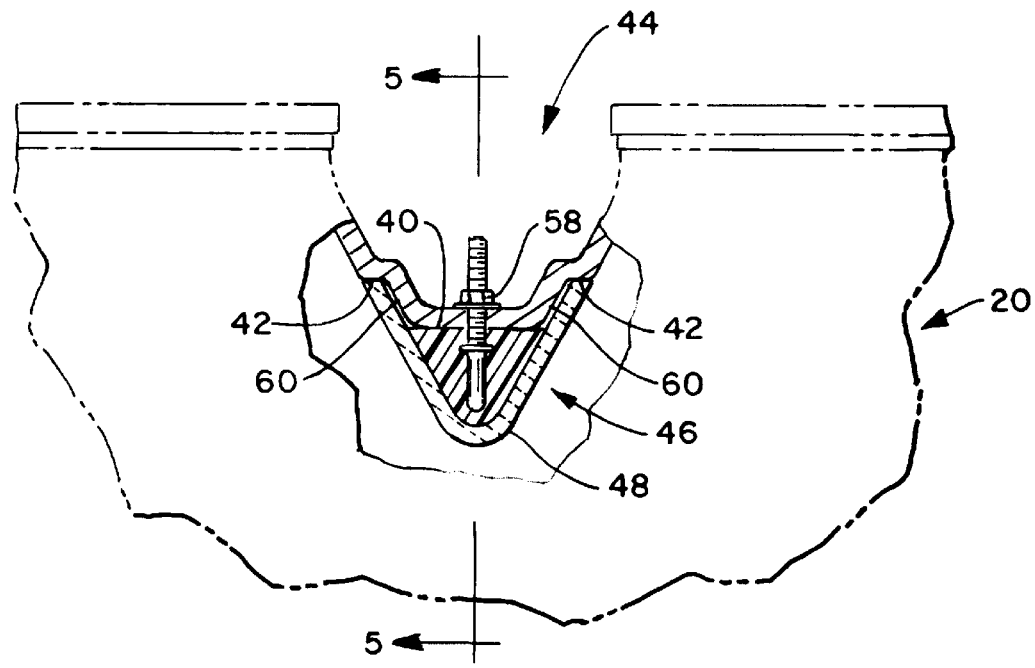
FIG. 4 is another broken away fragmentary plan view view in partial section of one form of the present invention.
Figure 5:
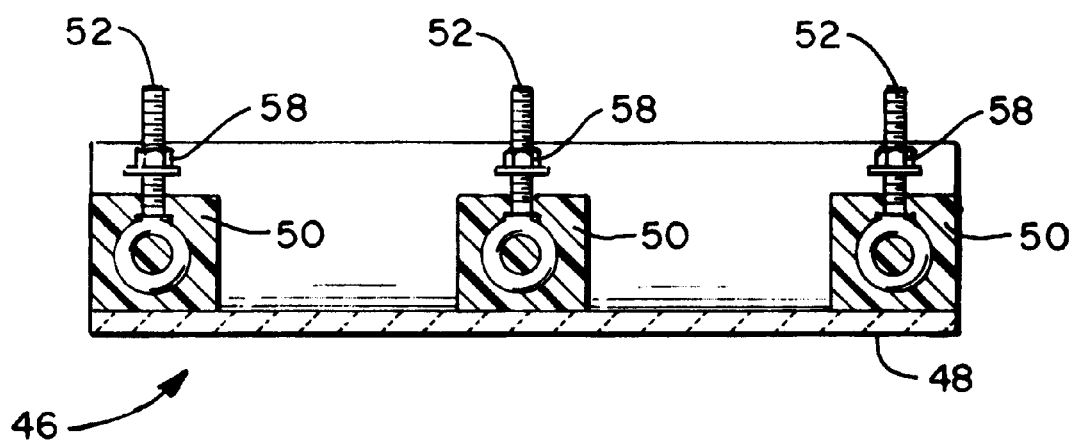
FIG. 5 is sectional view taken along the line 5—5 of FIG. 4.

FIGS. 2, 4 and 5 illustrate the apparatus in accordance with one form of the present invention. A Y-shaped distributor 20 having an inlet 22 to which a pipe 24 extending from a pulverizer (not shown) is connected. Typically, the pulverizer will include an exhaust fan to urge the flow of pulverized coal. As noted before any supply of pulverized coal and air may be supplied to the distributor 20. A clamp 26 secures the pipe 34 to the inlet 22.

The distributor includes two outlets 28, 30 that are secured respectively to pipes 32, 34 by respective clamps 36, 38. The pipes 24, 32, 34 and the cooperating inlet 22 and outlets 32, 34 are typically between seven to twenty inches in diameter.

Figure 3:
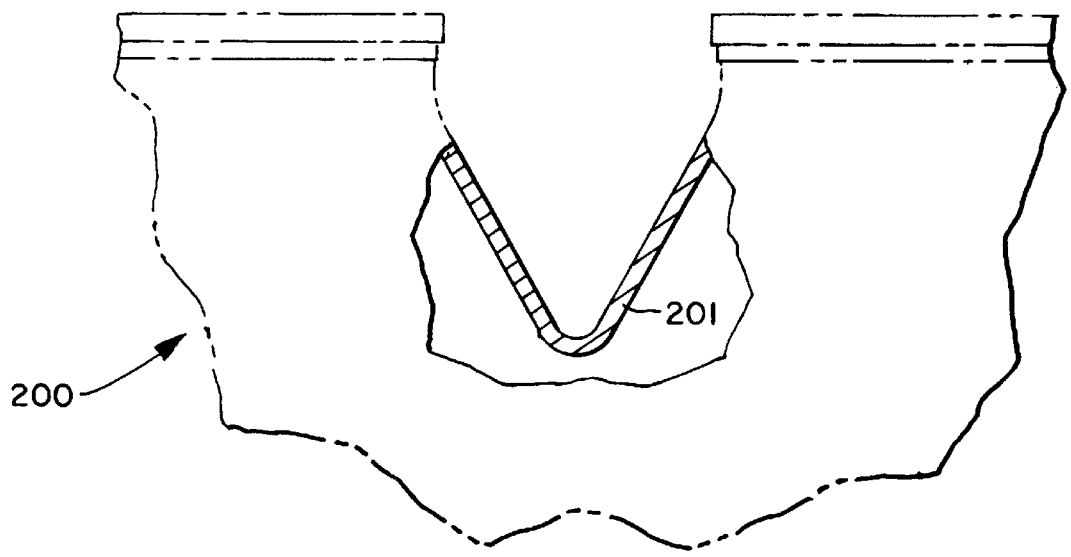
FIG. 3 is a broken away fragmentary plan view view illustrating the prior art structure.

The prior art distributor 200, shown in FIG. 3, is substantially the same as the structure that has been described in the preceding two paragraphs. FIG. 3 illustrates the cross section of the prior art splitter portion 201. It is this portion 201 that is most sensitive to the erosion of the mixture of coal and air that flows through the distributor. The tons of coal flowing through the distributor 20 causes a severe erosion problem on the portion 201.

The distributor 20 in accordance with the present invention has a seat 40 that includes a planar surface disposed in normal relationship to the direction of air flow from the inlet 22. Each side of the planar surface 40 is bounded by a shoulder 42 that also extends in substantially normal relationship to the to the direction of air flow from the inlet 22. Comparison of FIGS. 3 and 4 will reveal that the splitter portion 201 has been truncated in the preferred embodiment of the present invention. The planar surface 40 is bounded by diverging sides 60, 60 dimensioned and configured for engaging the liner assembly 46. The surface 40, sides 60, 60 and shoulders 42, 42 are collectively referred to herein as a base 44. Similarly, the term "housing" is used herein to refer collectively to the apparatus that includes the inlet 22, outlets 28, 30, seat 40, shoulders 42, 42, sides 60, 60 and base 44.

Mounted on the base 44 is a liner assembly 46. The liner assembly 46 is generally V-shaped and dimensioned and configured for engagement with the base 44. When the liner assembly 46 is mounted on the base 44 the internal contours of the distributor 20 are substantially the same as the distributor 200. More particularly, the contours of the splitter 201 in the distributor 200 are substantially identical to the contours of the assembly of the base 44 and the liner assembly 46.

The liner assembly 46 is constructed with a very hard shell 48 which is filled with a urethane fill 50. Three eyebolts 52, 52, 52 are secured in respective blocks 50 of urethane that has been deposited within the shell 48 by an in situ foam polymerization process. Individual blocks of urethane are used to secure the eyebolts 52 rather than one large block of urethane in the illustrated embodiment. This construction has a slight cost advantage over other embodiments of the invention that use a single large block of urethane.

As best seen in FIG. 4 the blocks 50 of urethane locate the shell 48 with respect to the base 44. The eyebolts 52 extend through respective holes in the base 44 where they are secured by respective nuts 58. The shell 48 has an included angle substantially the same as the side diverging sides or faces 60, 60 of the base 44. These sides 60, 60 are dimensioned and configured for side abutting engagement with the liner assembly 46. Preferably, clearance is provided between the shell 48 and the shoulders 42, 42 to avoid any compressive loading on the walls of the shell 48. Preferably an elastomeric compound is deposited at the interface of the shell with each of the shoulders 42, 42.

To facilitate replacement of the liner assembly 46, the distributor 20 is provided with an access panel 54 secured by bolts 56 along the periphery thereof. The access panel is preferably sized to extend over the area of the liner assembly 46. Accordingly, the liner assembly 46 will be subject to much less wear than the splitter 201. When replacement is necessary, it is merely necessary to remove the bolts 56 and remove the panel 54. Removal of the three nuts 58 allows withdrawal of the liner assembly 46 from the interior of the distributor 20. There is no necessity to remove the plants 26, 36 and 38.

The shell 48 is a material such as an alumina ceramic in the preferred embodiment. Various other hard materials may be used in other embodiments of the invention. It will be understood that even if the shell 48 were manufactured of the identical material as the housing of the distributor 20 there would still be major advantages inherent in the present invention. While it is not preferred to use the same material, those skilled in the art will recognize that will still facilitate replacement of the liner assembly 46 rather than replacement of the entire distributor 200.

The invention has been described with reference to its illustrated preferred embodiment. Persons skilled in the art of such devices may upon disclosure to the teachings herein, conceive other variations. Such variations are deemed to be encompassed by the disclosure, the invention being delimited only by the following claims.

Having thus described our invention, we claim:

1. Coal distribution apparatus which comprises:
   a Y-shaped distributor housing having one inlet and first and second outlets, said housing having a base intermediate said first and second outlets, said outlets and said inlet each having a respective axis, said housing having an opening proximate to an intersection of said axes of said outlets;
   a liner assembly disposed in said housing for dividing flow between said first and second outlets, said liner assembly having a generally V-shaped contour, said liner assembly being mounted on said base, said opening being dimensioned and configured to allow passage of said liner assembly into and out of said housing; and
   an access panel dimensioned and configured to engage said opening to prevent passage of matter out through said opening, when said access panel engages said opening.

2. The apparatus as described in claim 1, wherein:
   said liner assembly has a surface that is harder than the surface of said housing, said surface being on a portion of said liner assembly, said portion facing said inlet.

3. The apparatus as described in claim 2, wherein:
said base has diverging sides dimensioned and configured for engaging said liner assembly.

4. The apparatus as described in claim 2, wherein:
said access panel is generally planar.

5. The apparatus as described in claim 4, wherein:
said first and second outlets have axes defining a plane, said access panel when installed being disposed in a generally parallel relationship to said first plane.

6. The apparatus as described in claim 5, wherein:
said liner assembly comprises foamed material disposed in an abutting relationship with said base when said liner assembly is assembled to said housing.

7. The apparatus as described in claim 6, wherein:
said apparatus further includes means for anchoring said liner assembly, said means for anchoring being fixed to said foamed material.

8. The apparatus as described in claim 7, wherein:
said means for anchoring includes a plurality of eyebolts.

9. The apparatus as described in claim 7, wherein:
said means for anchoring is dimensioned and configured for engagement with said housing.

10. The apparatus as described in claim 9, wherein:
said base includes a mounting surface that is generally planar and disposed in a generally normal relationship to said axis of said inlet.

11. The apparatus as described in claim 10, wherein:
said base has first and second shoulders disposed on respective sides of said generally planar surface.

12. Apparatus which comprises:
a furnace for burning coal, said furnace including a plurality of burners;
a Y-shaped distributor housing having an inlet and first and second outlets, said housing having a base intermediate said first and second outlets, said outlets and said inlet each having a respective axis, said housing having an opening proximate to an intersection of said axes of said outlets;
a liner assembly disposed in said housing for dividing flow between said first and second outlets, said liner assembly having a generally V-shaped contour, said liner assembly being mounted on said base, said opening being dimensioned and configured to allow passage of said liner assembly into and out of said housing; and
an access panel dimensioned and configured to engage said opening to prevent passage of matter out through said opening when said access panel engages said opening; and
means for coupling said first and second outlets to respective burners from among said plurality of burners.

13. The apparatus as described in claim 12, wherein:
said liner assembly has a shell having a surface that is harder than the surface of said housing, said surface being on a portion of said liner assembly, said portion facing said inlet.

14. The apparatus as described in claim 13, wherein:
said access panel is generally planar.

15. The apparatus as described in claim 14, wherein:
said first and second outlets have axes defining a plane, said access panel when installed being disposed in a generally parallel relationship to said first plane.

16. The apparatus as described in claim 15, wherein:
said liner assembly comprises foamed material in an abutting relationship to said base and said shell.

17. The apparatus as described in claim 16, wherein:
said apparatus further includes means for anchoring said liner assembly, said means for anchoring being disposed in said foamed material.

18. The apparatus as described in claim 17, wherein:
said means for anchoring is dimensioned and configured for engagement with said housing.

19. The apparatus as described in claim 18, wherein:
said base includes a mounting surface that is generally planar and disposed in a generally normal relationship to said axis of said inlet.

20. The apparatus as described in claim 19, wherein:
said base has first and second shoulders disposed on respective sides of said generally planar surface.

* * * * *